Aug. 23, 1955    F. FRANZ    2,715,841
DRIVE MECHANISM FOR ELECTRIC METRONOMES OR THE LIKE
Filed Aug. 24, 1953    2 Sheets-Sheet 1

INVENTOR
Frederick Franz
BY Rockwell & Backhotomy
ATTORNEYS

Aug. 23, 1955    F. FRANZ    2,715,841
DRIVE MECHANISM FOR ELECTRIC METRONOMES OR THE LIKE
Filed Aug. 24, 1953    2 Sheets-Sheet 2

INVENTOR
Frederick Franz
BY Rockwell & Bachtolar
ATTORNEYS

2,715,841

DRIVE MECHANISM FOR ELECTRIC METRONOMES OR THE LIKE

Frederick Franz, West Haven, Conn.

Application August 24, 1953, Serial No. 375,879

6 Claims. (Cl. 74—191)

This invention relates to metronomes and more particularly to a driving mechanism for the striker of an electric metronome similar to that described in my prior Patent No. 2,150,967 issued March 21, 1939.

As illustrated in my prior patent, the structure employs a striking mechanism actuated by a rotatable driven member in the form of a disk, this member being actuated by a driving member of generally cone-shaped form which, in this instance, is the part of a rotor of a synchronous electric motor.

Electric metronomes must be made to sell at a relatively low price in order to compete with the older spring-wound pendulum-type metronomes, and since the driving motor is the most expensive element, it has been found necessary to utilize the electric clock-type motors as these are produced in quantity and are, therefore, less expensive than would be a special motor having a higher torque value which would be made only in small quantities. It has been found, however, that the power required to drive a metronome of this character is somewhat in excess of that required to operate an electric clock, and it is also true that clock motors vary considerably in output, often as much as 200% to 300% between the strongest and the weakest motors of a manufactured lot.

It is, therefore, necessary to reduce, as much as possible, the driving torque required to start and drive the mechanism of the metronome so that it may be driven by a relatively low torque motor. It is contemplated by the present invention to eliminate a parasitic load in the mechanism of the metronome in order to insure that the torque required will not exceed that which may be obtained from a low torque motor and thus avoid having to reject some or many motors of a manufactured lot.

This result is achieved, as will be explained hereinafter, by so disposing the axis of the driven disk with respect to the axis of the driving wheel (of generally cone-shaped form) upon the rotor of the motor so that the component of the force exerted upon the disk by the driving member will be in a direction tending to cause these members to separate or run free rather than to cause them to bind and thus increase the torque load required for driving the driven disk.

One object of the present invention is to provide an improved driving mechanism for an electric metronome.

A still further object of the invention is to provide a driving mechanism for a metronome comprising a driving member of generally cone-shaped form and comprising also a driven member of disk-like form, the edge of which is in contact with the surface of the driving member and so disposing the axes of the driving and driven members that the component of force exerted upon the driven member by the driving member will not cause these members to bind or increase the friction between them.

A still further object of the invention is to provide a driving mechanism for a metronome of the character set forth above, wherein the axis of the driven disk will be tilted or offset with respect to that of the driving member so that the two axes will not lie in the same plane and so that there will be a component of the force exerted by the driving member upon the driven member in a direction which will tend to cause the point of contact between the two members to move toward the portion of the driving member of smaller radius.

To these and other ends the invention consists in the novel features and combinations of parts to be hereinafter described and claimed.

Figure 1:
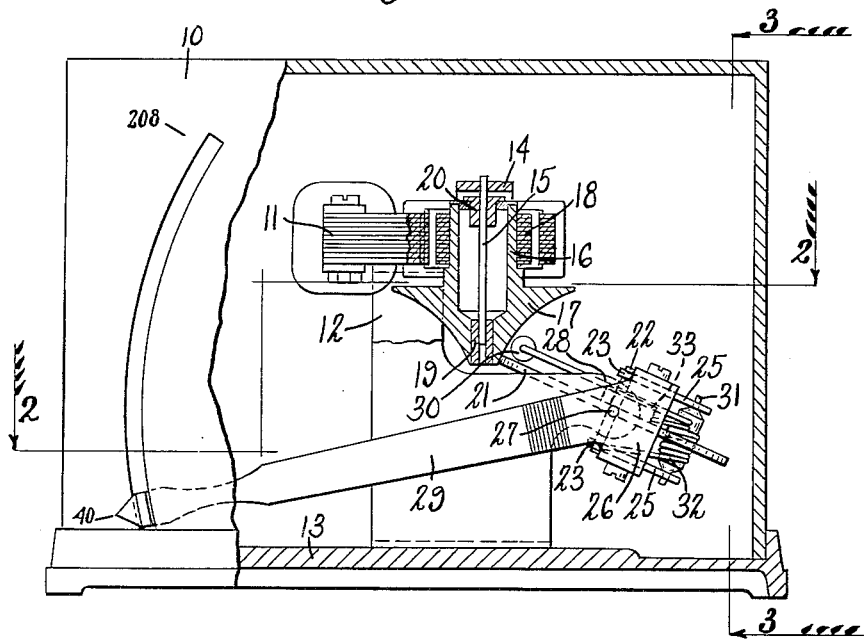
Fig. 1 is a side elevational view partly in section of an electric metronome embodying my invention, some parts being shown diagrammatically.

To illustrate a preferred embodiment of my invention, I have shown in the drawings an electric metronome comprising a case 10 within which is mounted an electric motor comprising a field structure 11 carried by a suitable supporting member 12, which in turn rests upon the base 13 of the case. Attached to the field of the motor is a strap member 14 to which is secured a downwardly depending arbor 15.

Upon this arbor is rotatably mounted the rotor 16 with which is integrally formed the driving member 17. Secured to the rotor is the armature 18 which co-operates with the field structure 11 to effect rotation of the rotor. The rotor is provided with bearings upon the arbor, as shown at 19 and 20, these bearings being rotatably mounted upon the arbor and permitting limited movement of the rotor longitudinally of the arbor.

As stated above, the driving surface of the member 17 is of substantially cone-shaped form but the elements of the surface are curved rather than straight lines, and in this case follow the arc of a circle drawn about a center which is substantially the center of the driven disk 21, which disk, as will be presently described, is mounted to tilt or swing about an axis in the plane of the disk so as to vary its point of contact with the surface of the driving member, and thus vary the speed of rotation of the disk relatively to that of the driving member. It will be obvious that when the disk 21 contacts the smaller end of the driving member, its rotational speed will be less than when it is in contact with the upper portion of the driving member which is of larger diameter.

Figure 2:
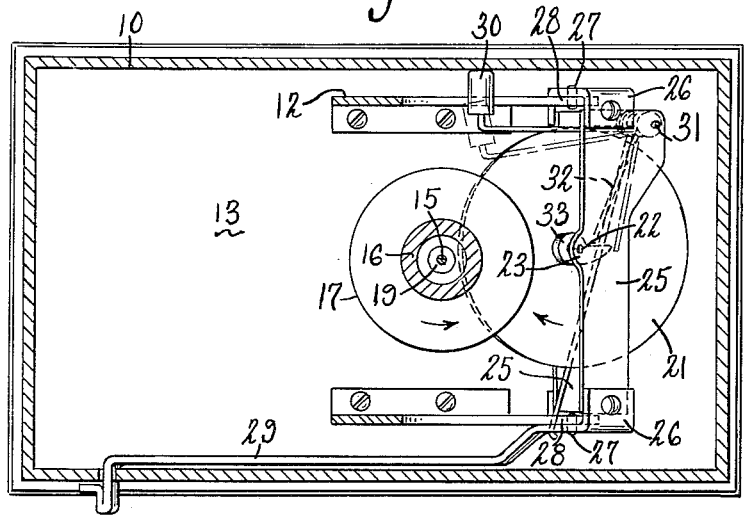
Fig. 2 is a horizontal sectional view on line 2—2 of Fig. 1.
Figure 3:
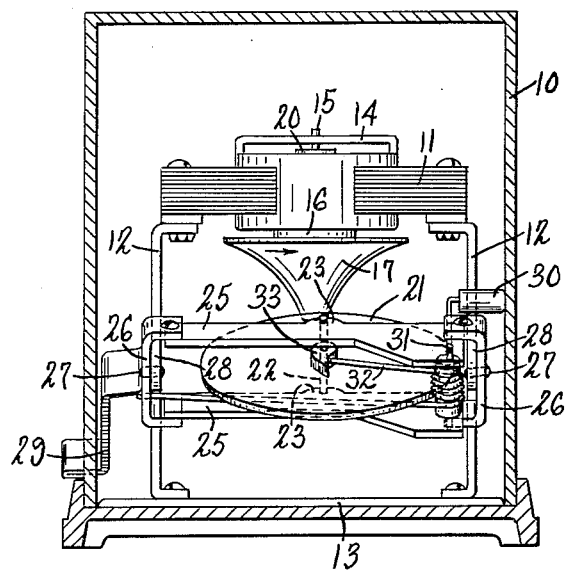
Fig. 3 is a vertical sectional view on line 3—3 of Fig. 1.

As shown in Figs. 2 and 3, the driven disk 21 is secured to a short shaft 22, which shaft is rotatably mounted in bearings 23 of a tiltably mounted cradle or frame. This cradle consists of upper and lower spaced frame members 25 between which the disk 21 lies, these frame members being connected by end members 26 which are mounted upon pivots 27 in ears 28 projecting rearwardly from the frame members 10. An adjusting arm 29 is secured to this cradle in order to tiltably adjust the same to vary the speed of the disks and the rate of beats of the metronome.

Also mounted on the cradle or frame which supports the driven disk is a striker 30 pivoted at 31 and having an arm 32 adapted to be contacted by the cam 33 in order to actuate the striker in the manner described in my prior patent.

It may be noted that the pivotal axis 27 of the frame is somewhat below the driving member 17 so that the driving disk is normally given an upward tilt whereby the driving member will receive vertical support from the disk so that frictional contact between the driving member and the disk will be maintained by the weight of the driving member and motor armature.

Figure 4:
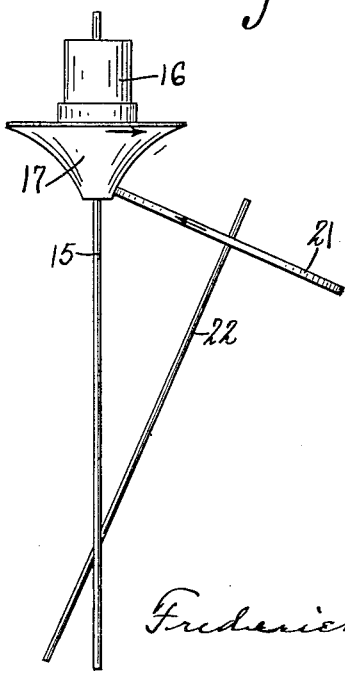
Fig. 4 is a diagrammatic view illustrating the disposition of the axes of the driving and driven members.

Ordinarily the frame or cradle in which the shaft 22 of the driving disk 21 is mounted would be so disposed that, if the shaft 22 and the axis 15 of the driving member were continued, as shown diagrammatically in Fig. 4, the two shafts or axes would intersect and lie in the same plane. With this arrangement a component of the reactive force exerted on the driving member by the driven disk 17 would be in a plane substantially transverse to the axis 15 so that there would be no component tending to change the position of the driving and driven members. However, inescapable errors of production result in these two axes being sometimes concurrent and sometimes non-concurrent. It will be seen that if the axes of these two members are such that the lower end of the axis 22 lies in front of the axis 15, as viewed in Fig. 4, and the driving and driven members are rotated in the direction indicated by the arrows in this figure, there will be a motion component in such a direction that the driving member 17 will tend to be moved downwardly or in a direction to cause the disk to engage a portion of the driving member of greater radius and, therefore, cause a binding action between these two members.

If, however, the lower end of the axis 22 is so disposed as to lie rearwardly of the axis 15, as shown in Fig. 4, the motion component along the axis of the driving member will be not in a plane transverse to this axis, but in an upward direction, thus tending to urge the driving member upwardly so that there will be a tendency to maintain contact between the two members along a line on a smaller portion of the driving member. Such an orientation of the two axes will prevent any binding action between the two or a parasitic drag tending to increase the power necessary to actuate the mechanism of the metronome. This displacement of the axis 22 is preferably effected, as shown in the drawing, by offsetting this axis with respect to the axis 15, so that, as viewed in Fig. 4, it lies rearwardly of the axis 15. The same result could be achieved by tilting the axis 22 rearwardly at its lower end.

According to the present invention, therefore, the axes of the driving member 17 and the driving disk 21 are so arranged that the axes of these two members are non-concurrent and cannot approach concurrence due to normal manufacturing variations. Moreover, the axes are offset in the direction that will provide for the motion component along the axis of the driving member to be such as to free it from any binding contact with the driven disk.

Figure 5:
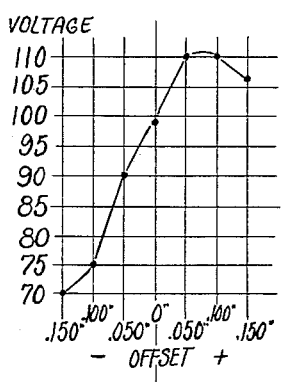
Fig. 5 is a graph showing the results obtained by a mechanism constructed according to the present invention.

In Fig. 5 of the drawings I have shown a graph of the results obtained by experiment of the relation between the motor torque required to drive the assembly with various offsets of the axis of the driven disk with relation to that of the driving member or cone. In the graph the voltage is plotted against the offset in inches of the axis of the shaft 22, the voltage being that which would start the mechanism in rotation and allow the motor to attain synchronous speed at a particular offset. It will be noted that while approximately 99 volts were required when the axes are concurrent, this voltage decreased when the offset was in one direction down to 70 volts at an offset of .150 inch. Moreover, when the offset was in the other direction from the point of concurrence of the axes, the voltage rose and was greatest when the offset was approximately .075 inch. It will be seen, therefore, that when the orientation of the axes of the cone and driving wheel is arranged, as shown in Fig. 4, with relation to the direction of rotation of the driving and driven members, less voltage is required to start the mechanism and allow the motor to attain synchronous speed. Such a deliberate orientation of the two axes will permit the use of the ordinary commercial synchronous clock motors which may be made in production quantities as the required voltage to operate the metronome mechanism will not exceed that of the weakest of such motors.

While I have shown and described a preferred embodiment of my invention, it will be understood that it is not to be limited to all of the details shown, but is capable of modification and variation within the spirit of the invention and within the scope of the claims.

What I claim is:

1. A change speed drive mechanism for an electric metronome comprising a driving member of conoidal form, a driven member of disk-like form having its edge in engagement with the surface of the driving member, the axis of one of said members being inclined relatively to the axis of the other, and the axis of the driven member being at all times non-coplanar with that of the driving member and lying on that side of the axis of the driving member toward which said members move at their point of engagement to avoid binding of the driving and driven members during rotation in one direction.

2. A change speed drive mechanism for an electric metronome comprising a driving member of conoidal form, and a driven member of disk-like form having its edge in engagement with the surface of the driving member, the axis of one of said members being inclined relatively to the axis of the other, the axis of the driven member being permanently offset with respect to the axis of the driving member in the direction of motion of the latter at its point of engagement with the driven member to avoid binding of the driving and driven members during rotation in one direction.

3. A change speed drive mechanism for an electric metronome comprising a driving member of conoidal form, a driven member of disk-like form having its edge in engagement with the surface of the driving member, the axis of one of said members being inclined relatively to the axis of the other, the axis of the driven member being at all times non-coplanar with that of the driving member and lying on that side of the axis of the driving member toward which said members rotate at their point of engagement, and means for varying the inclined relationship of the axes of said members to obtain a change in speed of the driven member.

4. A change speed drive mechanism for an electric metronome comprising a driving member of conoidal form, a driven member of disk-like form having its edge in engagement with the surface of the driving member, the axis of one of said members being inclined relatively to the axis of the other, the axis of the driven member being permanently offset with respect to the axis of the driving member in the direction of rotation of the latter at its point of engagement with the driven member, and means for swinging the driven member about an axis transverse to its axis of rotation to vary the inclined relationship of the axes of said members to obtain a change in speed of the driven member.

5. A driven mechanism for an electric metronome comprising a driving member of conoidal form, a driven member of disk-like form having its edge in engagement with the surface of the driving member, the axis of one of said members being inclined relatively to the axis of the other, and the axes of said members being permanently so positioned that a component of the reactive force exerted on the driving member by the driven member will tend to cause engagement between the two members on a circle on the driving member of smaller diameter to avoid binding of said members.

6. A change speed drive mechanism for an electric metronome comprising a driving member of tapered form with its smaller end directed downwardly, a driven member of disk-like form having its edge in engagement with the surface of the driving member, the axis of one of said members being inclined relatively to the axis of the other, and the axes of said members being permanently so positioned that a component of the reactive force of the driven member exerted on the driving member by the driven member is in a direction inclined upwardly relatively to a plane transverse to the axis of the driving member to avoid binding of the driving and driven members during rotation in one direction.

References Cited in the file of this patent

UNITED STATES PATENTS

| | | |
|---|---|---|
| 348,538 | Stribling | Aug. 31, 1886 |
| 890,748 | Allan | June 16, 1908 |

FOREIGN PATENTS

| | | |
|---|---|---|
| 697,594 | Germany | Oct. 17, 1940 |